(12) United States Patent
Atqiaee et al.

(10) Patent No.: US 11,679,656 B1
(45) Date of Patent: Jun. 20, 2023

(54) ELECTRIC DRIVE UNIT AND DRIVE AXLE SYSTEM

(71) Applicant: ArvinMeritor Technology, LLC, Troy, MI (US)

(72) Inventors: Arash Atqiaee, Troy, MI (US); James Derderian, Troy, MI (US); Dan S. Ursu, Troy, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 17/751,119

(22) Filed: May 23, 2022

(51) Int. Cl.
| | |
|---|---|
| *B60K 1/00* | (2006.01) |
| *F16H 57/02* | (2012.01) |
| *B60K 17/16* | (2006.01) |
| *B60K 17/22* | (2006.01) |
| *F16H 57/04* | (2010.01) |
| *F16H 57/037* | (2012.01) |
| *F16H 57/021* | (2012.01) |
| *F16H 48/38* | (2012.01) |

(52) U.S. Cl.
CPC .............. *B60K 1/00* (2013.01); *B60K 17/165* (2013.01); *B60K 17/22* (2013.01); *F16H 48/38* (2013.01); *F16H 57/021* (2013.01); *F16H 57/037* (2013.01); *F16H 57/0423* (2013.01); *F16H 57/0436* (2013.01); *B60K 2001/001* (2013.01); *F16H 2057/02034* (2013.01); *F16H 2057/02052* (2013.01)

(58) Field of Classification Search
CPC ..................... B60K 1/00; F16H 57/021; F16H 2057/02034
See application file for complete search history.

(56) References Cited

U.S. PATENT DOCUMENTS

| | | | |
|---|---|---|---|
| 9,441,717 B2* | 9/2016 | Smetana | B60K 1/02 |
| 9,987,918 B2* | 6/2018 | Haupt | F16H 37/0813 |
| 10,500,941 B2* | 12/2019 | Garcia | F16H 57/037 |
| 11,001,140 B1* | 5/2021 | Varela | B60K 7/0007 |
| 11,034,237 B2* | 6/2021 | Hirao | F16D 21/04 |
| 11,220,176 B1* | 1/2022 | Cradit | F16H 37/082 |
| 11,273,700 B2 | 3/2022 | Garcia et al. | |
| 2009/0321156 A1* | 12/2009 | Perkins | B60K 6/26 903/910 |
| 2021/0071751 A1* | 3/2021 | Fujii | H02K 9/193 |

FOREIGN PATENT DOCUMENTS

| | | | | |
|---|---|---|---|---|
| DE | 102011007265 A1 * | 10/2012 | | B60K 1/00 |
| DE | 102020108002 A1 * | 9/2021 | | |
| JP | 2004058700 A * | 2/2004 | | |
| WO | WO-2014083423 A1 * | 6/2014 | | B60K 1/00 |

* cited by examiner

*Primary Examiner* — Sherry L Estremsky
(74) *Attorney, Agent, or Firm* — Brooks Kushman PC

(57) ABSTRACT

An electric drive unit and a drive axle system having an electric drive unit. The drive axle system also includes a drive shaft and an axle assembly that that is remotely positioned from the electric drive unit. The drive shaft operatively connects the electric drive unit to the axle assembly.

20 Claims, 8 Drawing Sheets

US 11,679,656 B1

ELECTRIC DRIVE UNIT AND DRIVE AXLE SYSTEM

TECHNICAL FIELD

This relates to an electric drive unit and a drive axle system having an electric drive unit.

BACKGROUND

An axle assembly having an electric motor module is disclosed in U.S. Pat. No. 11,273,000.

SUMMARY

In at least one embodiment a drive axle system is provided. The drive axle system includes an electric drive unit, an axle assembly, and a drive shaft. The electric drive unit includes an electric motor, a shaft, and a transmission. The electric motor has a rotor. The rotor is rotatable about a rotor axis. The shaft is rotatable about the rotor axis. The transmission operatively connects the rotor and the shaft. The axle assembly is remotely positioned from the electric drive unit. The axle assembly includes an axle housing assembly. The axle housing assembly receives a differential assembly. The axle assembly includes a drive pinion. The drive pinion meshes with a ring gear of the differential assembly. The drive shaft operatively connects the second shaft to the drive pinion.

The electric drive unit may be received in an engine compartment of the vehicle. The axle assembly may be disposed rearward of the engine compartment.

The electric drive unit may have a housing assembly. The housing assembly may receive the electric motor, the shaft, and the transmission. The drive shaft may be disposed outside of the housing assembly. The drive shaft may be disposed outside of the axle housing assembly.

The housing assembly may include a support housing. The support housing may encircle the shaft. The support housing may be encircled by the rotor. The electric motor may be positioned along the rotor axis between the transmission and the support housing.

The support housing may include a tubular portion. The tubular portion may encircle the shaft. The rotor may be rotatably disposed on the tubular portion.

The tubular portion may include a first internal wall. The first internal wall may extend toward the rotor axis and may define a first opening. The first opening may receive a bearing. The bearing may receive the shaft. The bearing may rotatably support the rotor shaft.

The tubular portion may include a second internal wall. The second internal wall may extend toward the rotor axis. The second internal wall may be remotely positioned from the first internal wall. The second internal wall may define a second opening. The second opening may receive a seal. The seal may extend from the second internal wall to the shaft.

The first internal wall and the second internal wall may cooperate to at least partially define a first chamber. The first chamber may route lubricant to the transmission.

The support housing may define a second chamber. The second chamber may be separated from the first chamber by the second internal wall. The second chamber may be disposed between the second internal wall and an end housing of the housing assembly. Lubricant may flow from the transmission to the second chamber and through the second chamber to reach a sump portion.

The support housing may include a mounting flange. The mounting flange may extend from an end of the tubular portion in a direction that extends away from the rotor axis.

The housing assembly may include a motor housing. The motor housing may encircle the electric motor.

The housing assembly may include an end housing. The support housing may be mounted to the motor housing and to the end housing such that the support housing separates the motor housing from the end housing.

The end housing may have an end wall. The end wall may define an opening through which the shaft extends. The shaft may extend through the opening. The shaft may extend outside the housing assembly. The end housing may have a pocket. The pocket may be disposed adjacent to the opening. The pocket may receive a bearing assembly. The bearing assembly may support the shaft.

The shaft may have a flange. The flange may extend away from the rotor axis. The flange may be received in the opening of the end wall between the end wall and the bearing assembly. The flange may limit movement of the shaft along the rotor axis toward the electric motor.

The end housing may define a sump portion. The sump portion may receive lubricant. A lubricant pump that is driven by the shaft may pump lubricant from the sump portion. The lubricant pump may be disposed inside the end housing. The lubricant pump may be mounted to the end wall. The lubricant pump may be disposed on an opposite side of the end wall from the bearing assembly. Lubricant from the lubricant pump may flow through a passage in the end housing to a passage in the support housing. Lubricant may flow from the passage in the support housing to the first chamber.

The passage in the end housing may be located inside of a boss of the end housing. The boss may extend from an exterior wall of the end housing toward the rotor axis.

The passage in the support housing may be defined inside an exterior wall of the support housing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
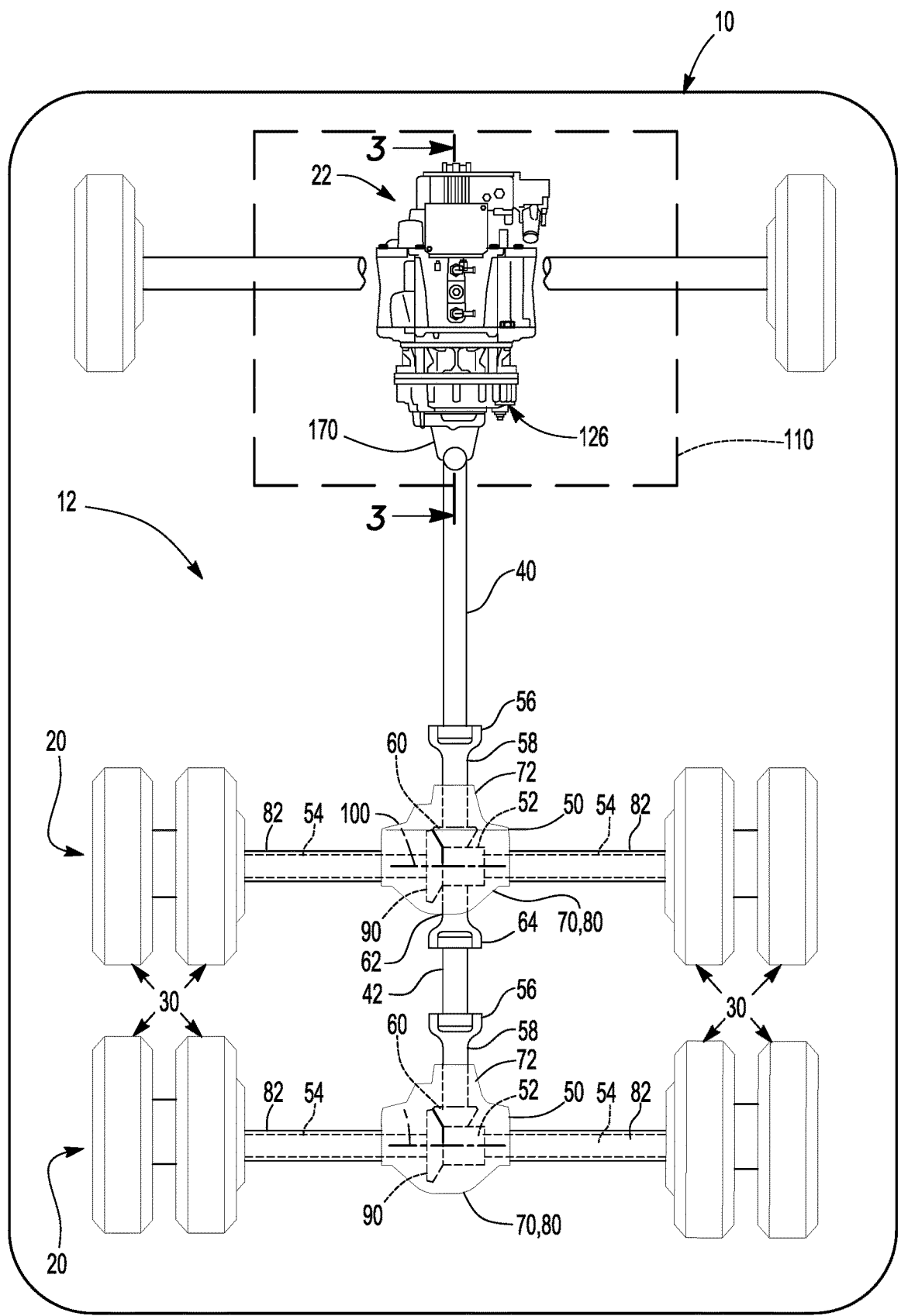
FIG. 1 is a depiction of an example of a drive axle system having an electric drive unit.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments. The vehicle 10 may have a drive axle system 12 that may include one or more axle assemblies 20 and an electric drive unit 22.

An axle assembly 20 may provide torque to one or more wheel assemblies 30 that may be rotatably supported on the axle assembly 20. A wheel assembly 30 may include a tire disposed on a wheel. In FIG. 1, two axle assemblies are shown in a tandem axle configuration, although it is contemplated that a greater or lesser number of axle assemblies may be provided. In a tandem configuration, a front axle assembly is connected in series with a rear axle assembly. The front axle assembly may be operatively connected to the electric drive unit 22, such as with a drive shaft 40. The drive shaft 40 is disposed outside of an axle housing assembly 50 of the axle assembly 20 and outside of a housing assembly 126 of the electric drive unit 22. An output of the front axle assembly may be coupled to an input of the rear axle assembly, such as with a shaft like a prop shaft 42. The prop shaft 42 may be coupled to an output of the front axle assembly and an input of the rear axle assembly at opposing ends via couplings, such as universal joints, that may allow the front axle assembly and the rear axle assembly to move with respect to each other while allowing the prop shaft 42 to rotate.

The axle assembly 20 or axle assemblies are remotely positioned from or completely spaced apart from the electric drive unit 22. In the example shown, an axle assembly 20 may include an axle housing assembly 50, a differential assembly 52, a pair of axle shafts 54, an input yoke 56, an input shaft 58, and a drive pinion 60. In a tandem axle arrangement, the front axle assembly 20 may also include an output shaft 62 and an output yoke 64.

The axle housing assembly 50 receives various components of the axle assembly 20. In addition, the axle housing assembly 50 may facilitate mounting of the axle assembly 20 to the vehicle 10, such as via a suspension subsystem. In at least one configuration, the axle housing assembly 50 may include an axle housing 70 and a differential carrier 72.

The axle housing 70 may receive and support the axle shafts 54. In at least one configuration, the axle housing 70 may include a center portion 80 and at least one arm portion 82.

The center portion 80 may be disposed proximate the center of the axle housing 70. The center portion 80 may define a cavity that may receive the differential assembly 52. A lower region of the center portion 80 may at least partially define a sump portion that may contain lubricant 84 that may lubricate components of the axle assembly 20.

One or more arm portions 82 may extend from the center portion 80. For example, two arm portions 82 may extend in opposite directions from the center portion 80 and away from the differential assembly 52. The arm portions 82 may have similar configurations. For example, the arm portions 82 may each have a hollow configuration or tubular configuration that may extend around and may receive a corresponding axle shaft 54 and may help separate or isolate the axle shaft 54 from the surrounding environment. An arm portion 82 or a portion thereof may be integrally formed with the center portion 80 or may be separate from the center portion 80.

The differential carrier 72 may be mounted to the center portion 80 of the axle housing 70. The differential carrier 72 may support the differential assembly 52 such that differential assembly 52 is rotatable with respect to the differential carrier 72.

The differential assembly 52 facilitates the transmission of torque to the wheel assemblies 30 and permits the wheel assemblies 30 of a corresponding axle assembly 20 to rotate at different velocities in a manner known by those skilled in the art. The differential assembly 52 may be disposed in the center portion 80 of the axle housing assembly 50. For example, the differential assembly 52 may have a ring gear 90 that may be fixedly mounted on a differential case. The ring gear 90 and the differential case may be rotatable about a differential axis 100. The differential case may receive differential gears that may be operatively connected to the axle shafts 54. Torque that is provided to the drive pinion 60 may be transmitted to the ring gear 90. As such, the differential assembly 52 may receive torque via the ring gear 90 and provide torque to the axle shafts 54 and to its associated wheel assemblies 30 via the differential case and the differential gears.

The axle shafts 54 are configured to transmit torque from an associated differential to corresponding wheel assemblies 30. For example, two axle shafts 54 may be provided such that each axle shaft 54 extends through a different arm portion 82 of axle housing 70. Each axle shaft 54 may extend along and may be rotatable about an axis. For instance, the axle shafts 54 may be rotatable about different axes or a common axis, such as the differential axis 100.

The input yoke 56 facilitates coupling of an axle assembly 20 to a shaft, such as the drive shaft 40 or the prop shaft 42. The input yoke 56 may be mounted on the input shaft 58 and may rotate with the input shaft 58.

The input shaft 58 is operatively connected to the drive pinion 60. The input shaft 58 may extend along and may be rotatable about an axis that differs from the differential axis 100.

The drive pinion 60 facilitates the transmission of torque between the input shaft 58 and the differential assembly 52. The drive pinion 60 may extend along and may be configured to rotate about the same axis as the input shaft 58 or may be rotatable about a different axis. The drive pinion 60 may be rotatably supported by one or more roller bearing assemblies that may be disposed on the differential carrier 72. The drive pinion 60 may include a gear portion that has a plurality of teeth that may mesh or mate with corresponding teeth on the ring gear 90.

The output shaft 62 facilitates the transmission of torque from one axle assembly to another. In the configuration shown in FIG. 1, an output shaft 62 is provided with the front axle assembly but not the rear axle assembly. The output shaft 62 is rotatable about an axis and may be supported by one or more roller bearings that may be disposed on the axle housing assembly 50. Optionally, the output shaft 62 may extend through the drive pinion 60. The output shaft 62 may be fixedly coupled to the output yoke 64.

The output yoke 64 facilitates coupling of the output shaft 62 to the prop shaft 42. The output yoke 64 may be mounted on the output shaft 62 and may rotate with the output shaft 62.

Referring to FIG. 1, the electric drive unit 22 may provide torque to one or more axle assemblies 20. In addition, the electric drive unit 22 may receive torque from one or more axle assemblies 20 and function as a generator that may charge an electrical power source, such as a battery. The electric drive unit 22 is remotely positioned from the axle assemblies 20. As such, the electric drive unit 22 is not mounted to an axle assembly 20 and does not contact the axle assemblies 20. In at least one configuration, the electric drive unit 22 may be received in an engine compartment 110 of the vehicle 10 while the axle assembly 20 may be disposed rearward of the engine compartment 110. For instance, the electric drive unit 22 may be configured to replace an internal combustion engine in a vehicle that was originally outfitted with an internal combustion engine. It is also contemplated that the electric drive unit 22 may be disposed in a location other than the engine compartment. For example, the electric drive unit 22 may be disposed wherever there is sufficient packaging space on the vehicle 10 and may be disposed further rearward or closer to the axle assemblies 20 than illustrated.

Figure 2:
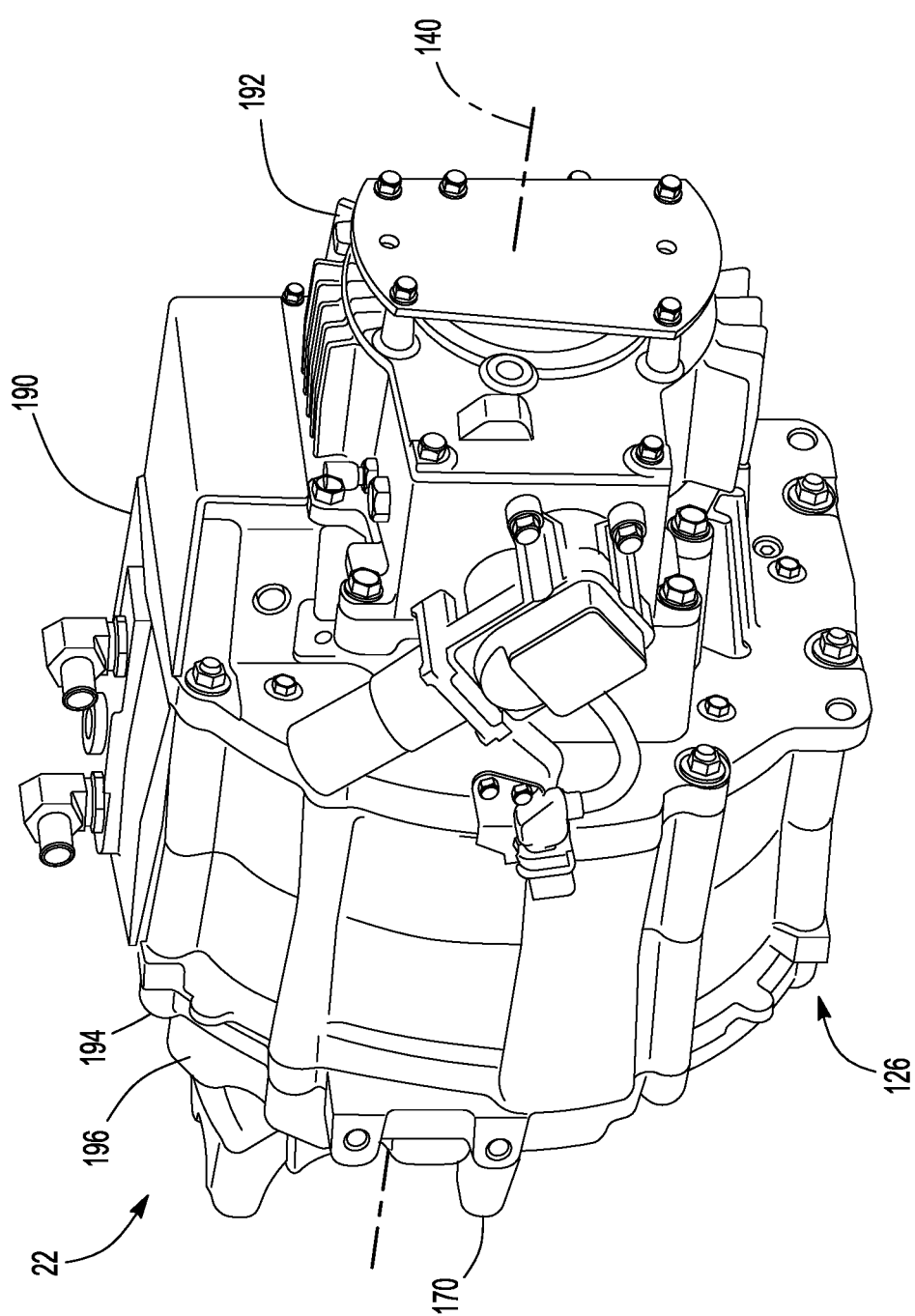
FIG. 2 is a perspective view of the electric drive unit.
Figure 3:
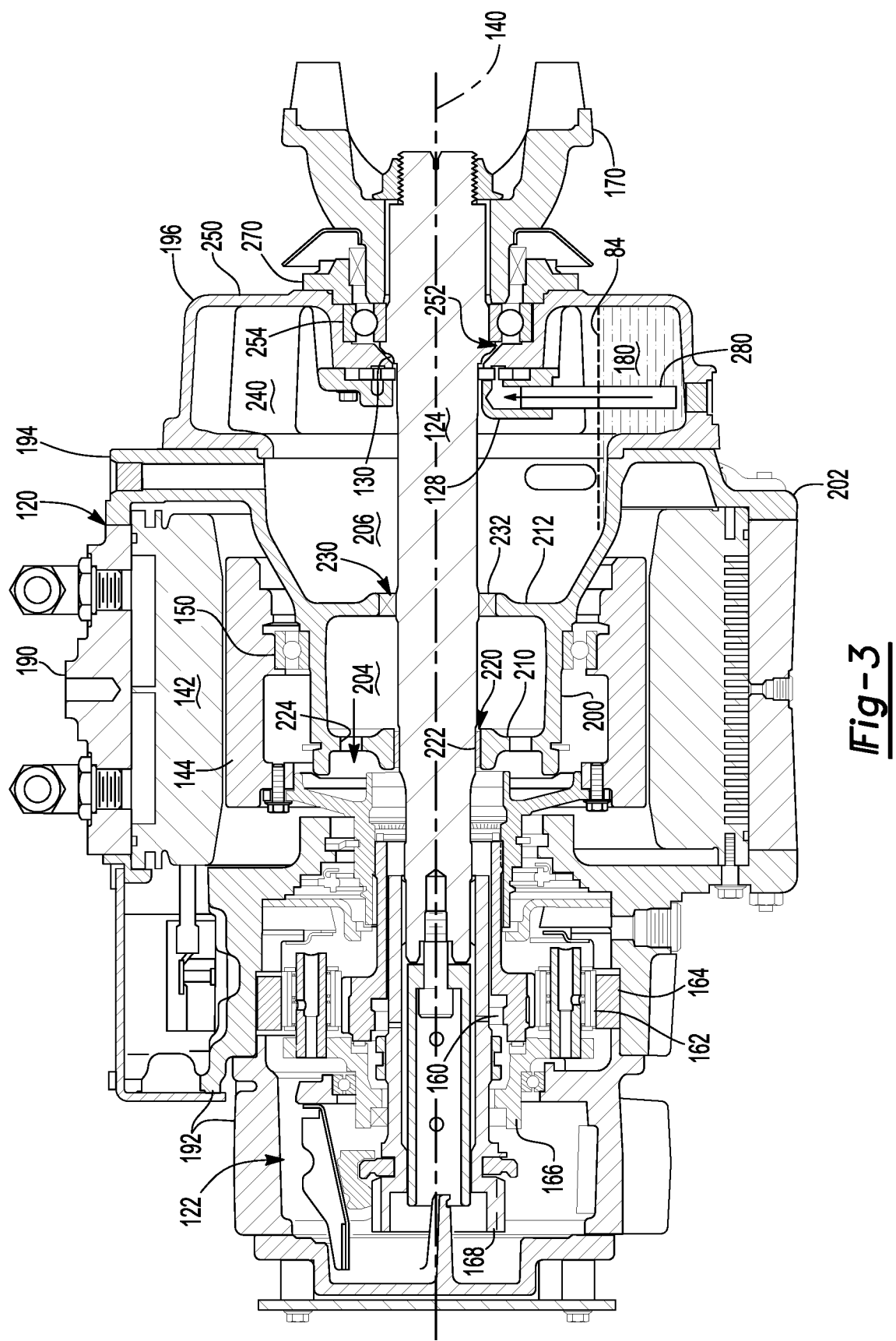
FIG. 3 is a section view of the electric drive unit along section line 3-3.

Referring to FIGS. 2 and 3, perspective and section views of the electric drive unit 22 are shown. In at least one configuration and as is best shown in FIG. 3, the electric drive unit 22 includes an electric motor 120, a transmission 122, a shaft 124, a housing assembly 126, and a lubricant pump 128.

The electric motor 120 may be positioned along a rotor axis 140 between the transmission 122 and the support housing 194 of the housing assembly 126. The rotor axis 140 may be disposed substantially perpendicular to the differential axis 100. The term "substantially perpendicular" is used herein to designate features or axes that are the same as or very close to perpendicular and includes features that are within ±3° of being perpendicular each other. The electric motor 120 may be electrically connected to the electrical power source via an inverter in a manner known by those skilled in the art. The electric motor 120 includes a stator 142 and a rotor 144.

The stator 142 may be fixedly positioned with respect to the housing assembly 126. The stator 142 may encircle the rotor axis 140 and a rotor 144.

The rotor 144 is rotatable about the rotor axis 140 with respect to the stator 142. The rotor 144 may include material that facilitates the generation of electrical current. The rotor 144 may be rotatably supported on one or more rotor bearings 150.

The transmission 122 operatively connects the rotor 144 and the shaft 124. As such, the transmission 122 may transmit torque between the electric motor 120 and the differential assembly 52. Torque transmission may be bidirectional. The transmission 122 may provide gear reduction or one or more gear ratios between the rotor 144 and the shaft 124. The transmission 122 may be of any suitable type. For instance, the transmission 122 may be a countershaft transmission, planetary gear set transmission, or the like. In the configuration shown, the transmission 122 is illustrated as having a planetary gear set that has a sun gear 160, planet gears 162, a planetary ring gear 164, and a planet gear carrier 166. The sun gear 160 may be operatively connected to the rotor 144. The planet gears 162 may mesh with the sun gear 160 and the planetary ring gear 164. The planetary ring gear 164 may encircle the planet gears 162. The planet gear carrier 166 may be rotatable about the rotor axis 140 and may rotatably support the planet gears 162.

A shift collar 168 may selectively couple components of the transmission 122 to the shaft 124. For instance, the shift collar 168 may be rotatable about the rotor axis 140 with the drive pinion 60 and moveable along the rotor axis 140 with respect to the drive pinion 60 between a first position and a second position in which different components are coupled to or operatively connected to the shaft 124. In the configuration shown, the shift collar 168 couples the sun gear 160 to the shaft 124 when in the first position and couples the shift collar 168 couples the planet gear carrier 166 to the shaft 124 when in the second position, thereby providing different gear ratios.

The shaft 124 is rotatable about the rotor axis 140. The shaft 124 may extend through the rotor 144. The shaft 124 may be rotatably supported by one or more bearing assemblies as will be discussed in more detail below. In addition, the shaft 124 may be operatively connected to the drive shaft 40 and spaced apart from the axle assembly 20. As such, the shaft 124 does not engage the differential assembly 52 or its ring gear 90. The shaft 124 may have a flange 130 that may extend away from the rotor axis 140 and that may encircle the shaft 124. The shaft 124 may include a coupling 170 or facilitate mounting of a coupling 170.

The coupling 170 is disposed outside of the housing assembly 126. The coupling 170 may have any suitable configuration. For instance, the coupling 170 may be configured as a yoke or fitting. The coupling 170 may be fixedly disposed on the shaft 124 and may be connected to the drive shaft 40, such as with universal joint.

Referring primarily to FIG. 3, the housing assembly 126 receives the electric motor 120, the transmission 122, and the shaft 124. The housing assembly 126 may include a motor housing 190, a transmission housing 192, a support housing 194, and an end housing 196.

The motor housing 190 may be provided with the electric motor 120. The motor housing 190 may encircle the electric motor 120. For instance, the motor housing 190 may encircle the stator 142. In addition, the motor housing 190 may extend from the transmission housing 192 to the support housing 194.

The transmission housing 192 may be provided with the transmission 122. The transmission housing 192 may receive and support the transmission 122. In addition, the transmission housing 192 may receive the shift collar 168 and may support an actuator that may actuate the shift collar 168.

Figure 8:
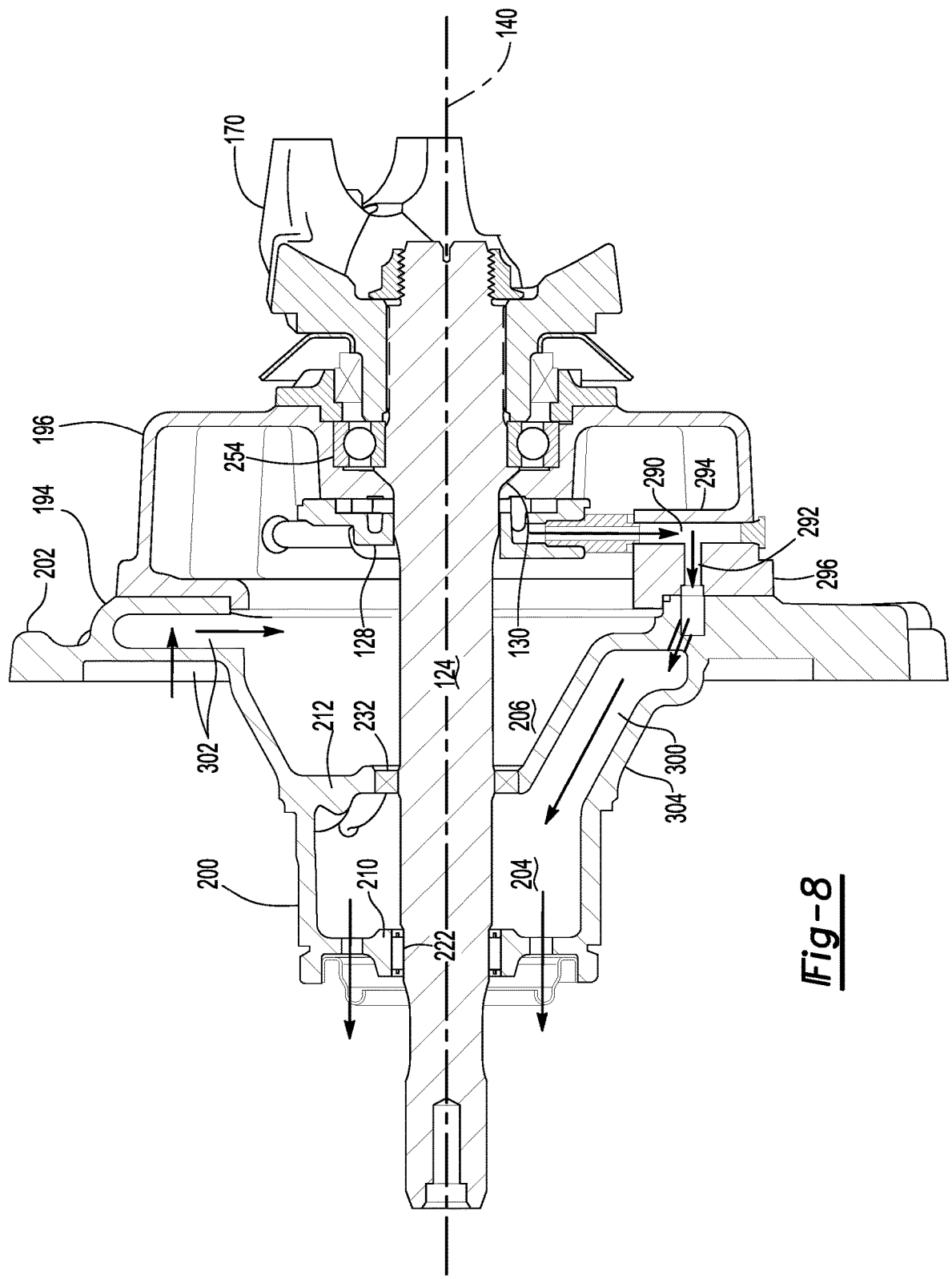
FIG. 8 is a section view of the portion of the electric drive unit along section line 8-8.

Referring to primarily to FIG. 3 as well as FIGS. 4-8, the support housing 194 extends from the motor housing 190 to the end housing 196. A portion of the support housing 194 may be encircled by the rotor 144 and may receive or encircle the shaft 124. In at least one configuration, the support housing 194 may include a tubular portion 200 and a mounting flange 202. In addition, the support housing 194 may at least partially define a first chamber 204 and a second chamber 206, which are best shown in FIGS. 3 and 8.

Referring primarily to FIG. 3, the tubular portion 200 may encircle the shaft 124. The rotor 144 may be rotatably disposed on the tubular portion 200. For instance, the rotor bearing 150 may encircle the tubular portion 200 and may rotatably support the rotor 144. In at least one configuration, the tubular portion 200 may include a first internal wall 210 and a second internal wall 212.

The first internal wall 210 may extend toward the rotor axis 140. The first internal wall 210 may define a first opening 220 that may encircle the rotor axis 140 and receive a bearing 222. The bearing 222 may receive and rotatably support the shaft 124. In addition, the first internal wall 210 may include one or more through holes 224. The through holes 224 may be spaced apart from the first opening 220 and may be arranged around the rotor axis 140.

The second internal wall 212 may be remotely positioned from the first internal wall 210. The second internal wall 212 may extend toward the rotor axis 140. The second internal wall 212 may define a second opening 230 that may receive a seal 232. The seal 232 may extend from the second internal wall 212 to the shaft 124. The seal 232 may inhibit lubricant 84 from flowing through the second opening 230 between the first chamber 204 and the second chamber 206.

The first chamber 204 may be at least partially defined by the first internal wall 210 and the second internal wall 212. The first chamber 204 may be axially positioned between the first internal wall 210 and the second internal wall 212. In addition, the first chamber 204 may be encircled by the tubular portion 200 of the support housing 194.

The second chamber 206 may be axially positioned between the second internal wall 212 and the end housing 196. At least a portion of the second chamber 206 may be encircled by the tubular portion 200.

Figure 4:
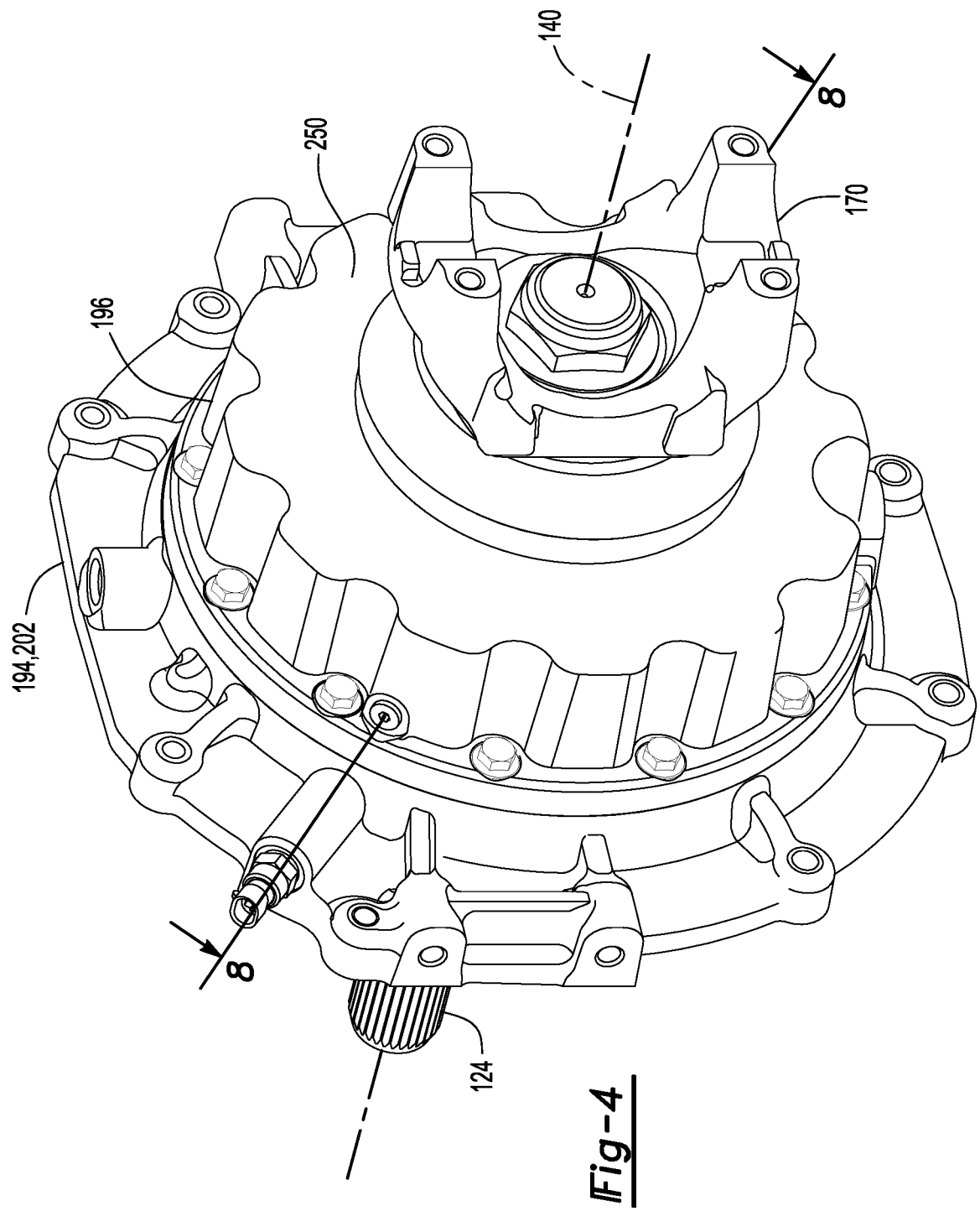
FIGS. 4 and 5 are perspective views of a portion of the electric drive unit.
Figure 5:
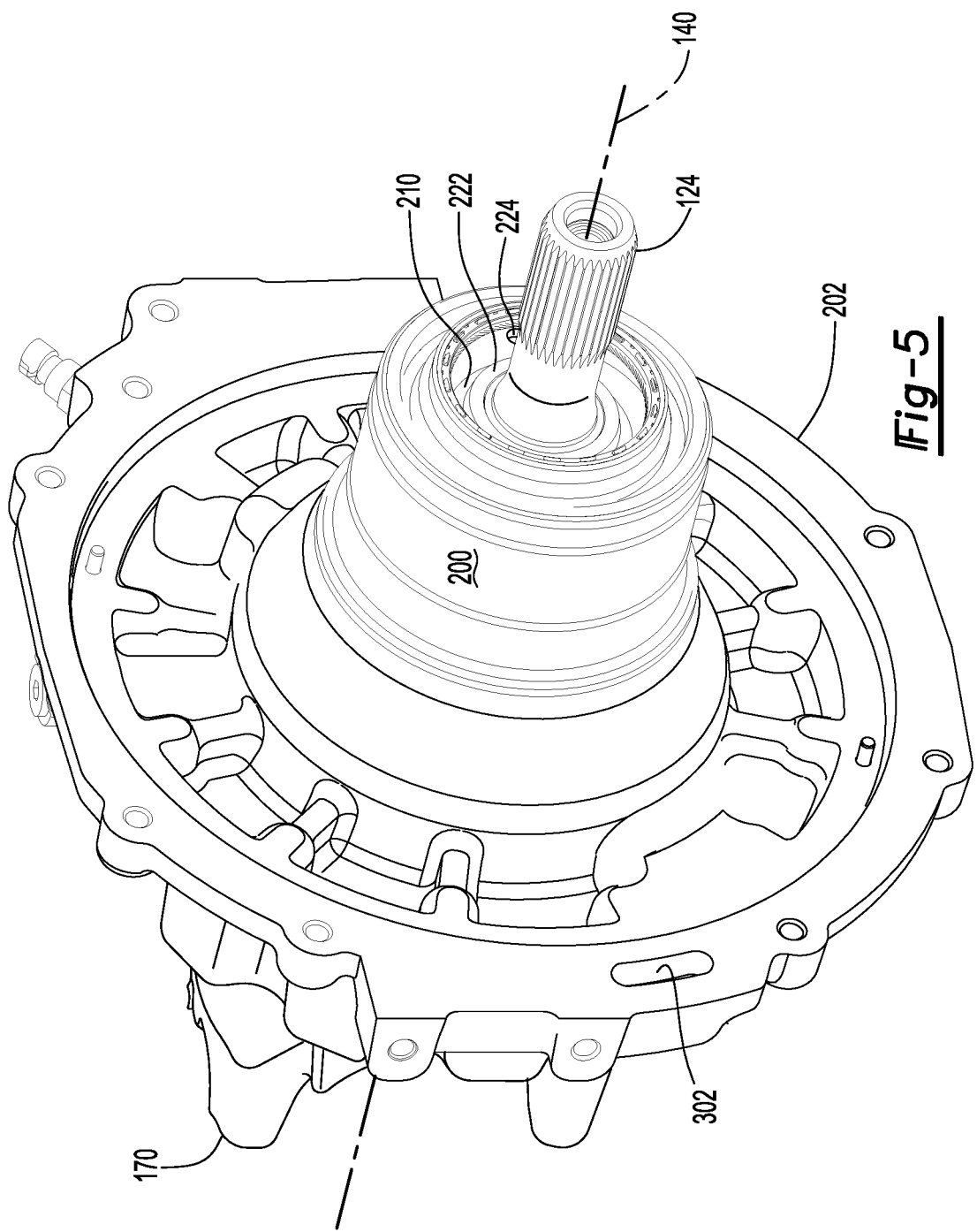

Referring primarily to FIG. 3 as well as to FIGS. 4 and 5, the mounting flange 202 may extend from an end of the tubular portion 200 in a direction that extends away from the rotor axis 140. The mounting flange 202 may be coupled to the motor housing 190 and to the end housing 196.

The end housing 196 may be disposed at an end of the housing assembly 126. The end housing 196 may be mounted to the mounting flange 202 of the support housing 194. The end housing 196 may be separated from the motor housing 190 by the support housing 194. For instance, the mounting flange 202 of the support housing 194 may extend from the motor housing 190 to the end housing 196 and may separate the motor housing 190 from the end housing 196.

Referring to FIG. 3, the end housing 196 or the end housing 196 along with the support housing 194 may define the sump portion 180 and a cavity 240. The sump portion 180 is disposed at the bottom of the cavity 240 and receives and collects lubricant 84. The cavity 240 may be positioned inside the end housing 196. The lubricant pump 128 may be positioned in the cavity 240. In at least one configuration and as is best shown with reference to FIGS. 3 and 7, the end housing 196 may include an end wall 250 and a pocket 252.

The end wall 250 may define an opening 260 through which the shaft 124 may extend. As such, the shaft 124 may extend through the opening 260 and from the cavity 240 to the outside of the housing assembly 126. The flange 130 of the shaft 124 may be received in the opening 260.

The pocket 252 may be disposed adjacent to the opening 260. The pocket 252 may receive a bearing assembly 254 that may encircle the shaft 124 and may rotatably support the shaft 124. The flange 130 of the shaft 124 may be received in the opening 260 of the end wall 250 and may be positioned along the rotor axis 140 between the lubricant pump 128 and the bearing assembly 254. The flange 130 may engage the end wall 250 and may limit movement of the shaft 124 along the rotor axis 140 toward the electric motor 120, or to the left from the perspective shown in FIG. 3.

Figure 6:
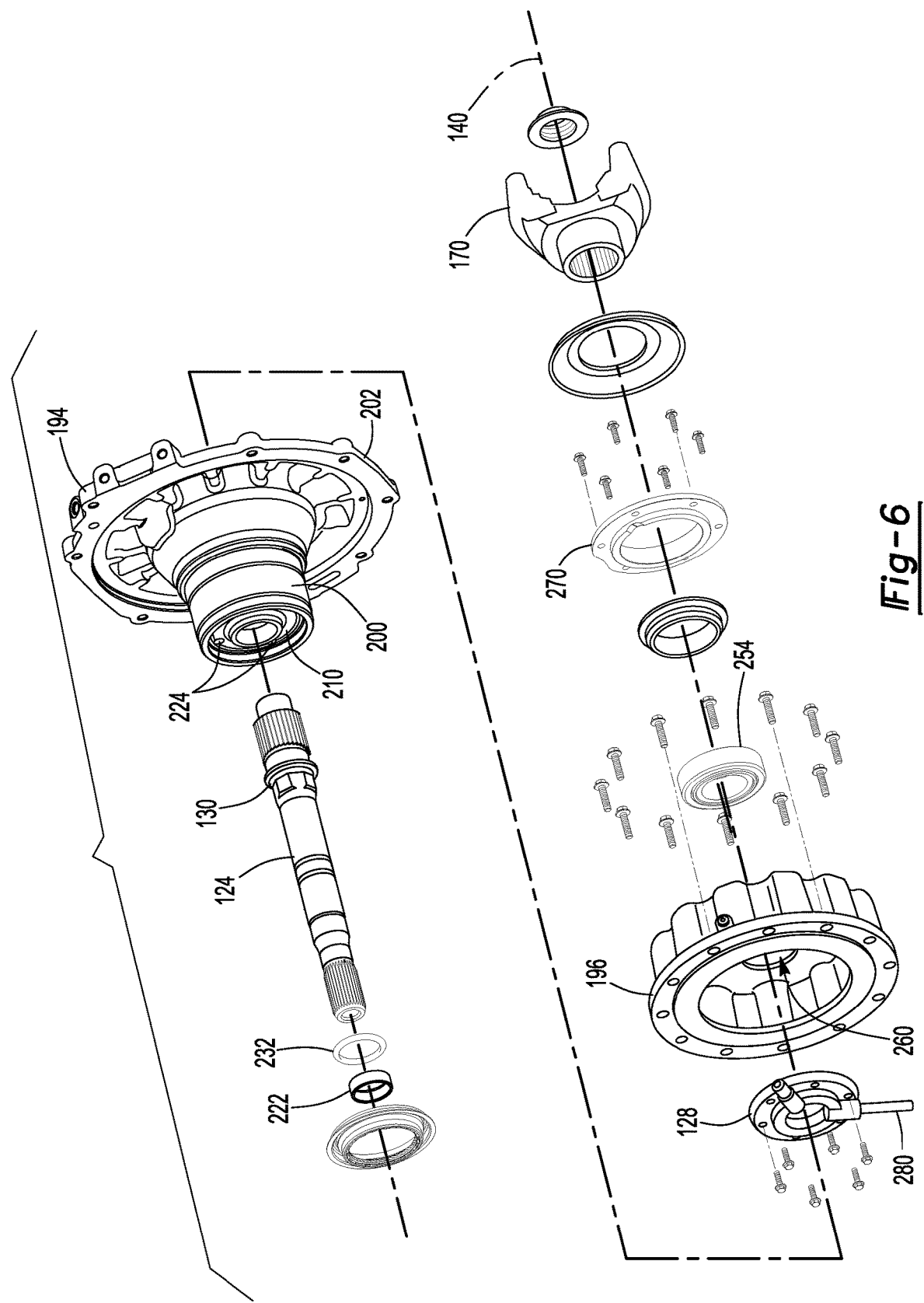
FIGS. 6 and 7 are exploded views of the portion of the electric drive unit shown in FIGS. 4 and 5.
Figure 7:
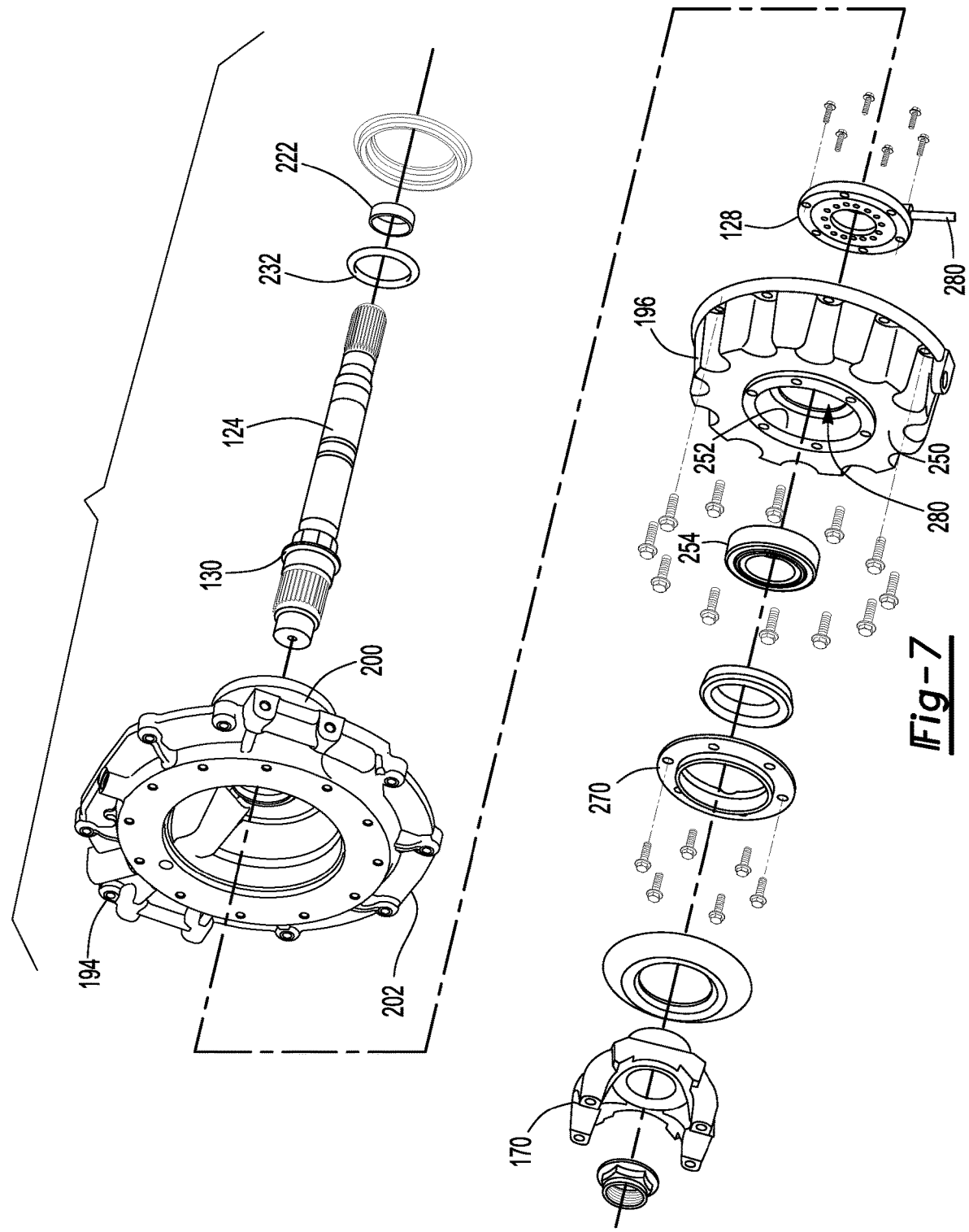

Referring to FIGS. 3 and 6, the lubricant pump 128 pumps lubricant 84 from the sump portion 180 to various components of the electric drive unit 22. For instance, the lubricant pump 128 may pump lubricant 84 to the transmission 122 and various bearings of the axle assembly 20. For instance, lubricant 84 that is pumped by the lubricant pump 128 may be pumped to the bearings that support the shaft 124. The lubricant pump 128 may be of any suitable type. In the configuration shown, the lubricant pump 128 is configured as a mechanical pump, such as a positive displacement pump like a gerotor pump, that is driven by the shaft 124. As such, the lubricant pump 128 may pump lubricant 84 when the shaft 124 rotates. In at least one configuration, the lubricant pump 128 may be disposed in the cavity 240, and thus inside the end housing 196. For instance, the lubricant pump 128 may be mounted to the end wall 250 and may be disposed on an opposite side of the end wall 250 from the bearing assembly 254.

A first end plate 270 may be mounted to the end wall 250. The first end plate 270 may encircle the shaft 124 and the rotor axis 140. The first end plate 270 may be disposed outside of the end housing 196 and may facilitate secure the bearing assembly 254. For instance, the first end plate 270 may retain the bearing assembly 254 in the pocket 252 and inhibit movement of the bearing assembly 254 to the right from the perspective shown in FIG. 3.

Referring to FIGS. 3 and 8, the flow of lubricant 84 in the electric drive unit 22 will now be described. Lubricant flow is represented by unnumbered arrowed lines in these figures.

Starting with FIG. 3, lubricant 84 may flow from the sump portion 180 to the lubricant pump 128 via a conduit 280 in response to suction created by the lubricant pump 128. The conduit 280 may be disposed inside the end housing 196 and may be fluidly connected to the lubricant pump 128; however, it is also contemplated that the conduit could be routed outside of the housing assembly 126.

Referring to FIG. 8, lubricant 84 that exits the lubricant pump 128 may flow through a passage 290. The passage 290 may be fluidly connected to a passage 292 that may be defined by the end housing 196 and that may be disposed near an exterior wall 296 of the end housing 196 that encircles the rotor axis 140. The passage 292 may be located within a boss 294 of the end housing 196 that extends from an exterior wall 296 of the end housing 196 toward the rotor axis 140.

The passage 292 may provide lubricant 84 to the support housing 194. For instance, an outlet of the passage 292 may be fluidly connected to an inlet of a corresponding passage 300 in the support housing 194. The passage 300 may extend from the passage 292 to the first chamber 204. The passage 300 may be located within an exterior wall 304 of the support housing 194. Lubricant 84 may then flow from the first chamber 204 through one or more through holes 224 in the first internal wall 210. Lubricant 84 that passes through the through holes 224 may then flow to the transmission 122 to lubricate its associated components.

Lubricant 84 may flow from the transmission 122 back to the sump portion 180 along a different path. For instance, lubricant 84 may flow from the transmission housing 192 through a passage in the motor housing 190. The passage in the motor housing 190 may be disposed between the exterior of the motor housing 190 and the stator 142 and may extend from an end of the motor housing 190 that is adjacent to the transmission housing 192 to an opposite end of the motor housing 190 that is adjacent to the mounting flange 202 of the support housing 194.

Lubricant 84 may enter an inlet 302 in the support housing 194 and direct lubricant 84 into the second chamber 206. As is best shown in FIG. 3, lubricant 84 may flow from the second chamber 206 to the sump portion 180 due to the force of gravity. Thus, lubricant 84 may flow from the transmission 122 through the passage within the motor housing 190 to the inlet 302, through the inlet 302 to the second chamber 206, and from the second chamber 206 to the sump portion 180.

An electric drive unit as described above may allow a vehicle having an internal combustion engine to be retrofitted or replaced with an electric drive or electric propulsion system without replacing or altering the axle assembly, thereby reducing the time and associated costs needed to retrofit a vehicle. Moreover, present invention may allow the electric drive unit to be remotely positioned from the axle assembly so that available space in the vehicle may be utilized to accommodate the electric drive unit, thereby reducing alterations to the vehicle. Moreover, the electric drive unit may provide design flexibility in new vehicles. For instance, by providing the electric drive unit remotely from the axle assembly a wider variety of locations may be used to package the electric drive unit as compared to designs in which an electric motor is directly mounted to the axle assembly or is provided adjacent to the vehicle wheels.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle system comprising:
   an electric drive unit that includes:
      an electric motor having a rotor that is rotatable about a rotor axis;
      a shaft that extends through the rotor and that is rotatable about the rotor axis; and
      a transmission that operatively connects the rotor and the shaft;
   an axle assembly that is remotely positioned from the electric drive unit, the axle assembly including an axle housing assembly that receives a differential assembly and a drive pinion that meshes with a ring gear of the differential assembly; and
   a drive shaft that operatively connects the shaft to the drive pinion, wherein the electric drive unit is received in an engine compartment of a vehicle and the axle assembly is disposed rearward of the engine compartment of the vehicle.

2. The drive axle system of claim 1 wherein the electric drive unit has a housing assembly that receives the electric motor, the shaft, and the transmission.

3. The drive axle system of claim 2 wherein the drive shaft is disposed outside of the housing assembly of the electric drive unit and outside of the axle housing assembly of the axle assembly.

4. An electric drive unit comprising:
   an electric motor having a rotor that is rotatable about a rotor axis;
   a shaft that extends through the rotor and that is rotatable about the rotor axis;
   a transmission that operatively connects the rotor and the shaft;
   a housing assembly that receives the electric motor, the shaft, and the transmission, wherein the housing assembly includes a support housing that is encircled by the rotor and that includes a tubular portion that encircles the shaft and a mounting flange that extends from an end of the tubular portion in a direction that extends away from the rotor axis, wherein the rotor is rotatably disposed on the tubular portion and the tubular portion includes a first internal wall that extends toward the rotor axis and that defines a first opening that receives a bearing that receives and rotatably supports the shaft; and
   a coupling that is fixedly disposed on the shaft outside of the housing assembly.

5. The electric drive unit of claim 4 wherein the electric motor is positioned along the rotor axis between the transmission and the support housing.

6. The electric drive unit of claim 4 wherein the tubular portion includes a second internal wall that extends toward the rotor axis and that is remotely positioned from the first internal wall, wherein the second internal wall defines a second opening that receives a seal that extends from the second internal wall to the shaft.

7. The electric drive unit of claim 6 wherein the first internal wall and the second internal wall cooperate to at least partially define a first chamber that routes lubricant to the transmission.

8. The electric drive unit of claim 7 wherein the support housing defines a second chamber that is separated from the first chamber by the second internal wall, wherein lubricant flows from the transmission to the second chamber and through the second chamber to reach a sump portion.

9. An electric drive unit comprising:
   an electric motor having a rotor that is rotatable about a rotor axis;
   a shaft that extends through the rotor and that is rotatable about the rotor axis;
   a transmission that operatively connects the rotor and the shaft;
   a housing assembly that receives the electric motor, the shaft, and the transmission, wherein the housing assembly includes a motor housing, a support housing, and an end housing, the motor housing encircles the electric motor, and the support housing is encircled by the rotor, encircles the shaft, and is mounted to the motor housing and the end housing such that the support housing separates the motor housing from the end housing; and
   a coupling that is fixedly disposed on the shaft outside of the housing assembly.

10. The electric drive unit of claim 9 wherein the housing assembly includes a support housing that is encircled by the rotor and that encircles the shaft.

11. The electric drive unit of claim 9 wherein the housing assembly includes a support housing that includes a tubular portion that encircles the shaft and a mounting flange that extends from the tubular portion in a direction that extends away from the rotor axis, wherein the rotor is rotatably disposed on the tubular portion.

12. The electric drive unit of claim 11 wherein the tubular portion includes a first internal wall that extends toward the rotor axis and that defines a first opening that receives a bearing that receives and rotatably supports the shaft.

13. The electric drive unit of claim 9 wherein the end housing has an end wall and a pocket, the end wall defines an opening through which the shaft extends to outside of the housing assembly, and the pocket is disposed adjacent to the opening and receives a bearing assembly that rotatably supports the shaft.

14. The electric drive unit of claim 13 wherein the shaft has a flange that extends away from the rotor axis and that is received in the opening between the end wall and the bearing assembly, wherein the flange limits movement of the shaft along the rotor axis toward the electric motor.

15. The electric drive unit of claim 13 wherein the end housing defines a sump portion that receives lubricant and wherein the electric drive unit further comprises a lubricant pump that is driven by the shaft and that pumps lubricant from the sump portion.

16. The electric drive unit of claim 15 wherein the lubricant pump is disposed inside the end housing, is mounted to the end wall, and is disposed on an opposite side of the end wall from the bearing assembly.

17. The electric drive unit of claim 16 wherein the support housing includes a first internal wall and a second internal wall that extend toward the shaft and cooperate to at least partially define a first chamber, and the support housing has a second chamber that is disposed between the second internal wall and the end housing, wherein lubricant from the lubricant pump flows through a passage in the end housing to a passage in the support housing and to the first chamber.

18. The electric drive unit of claim 17 wherein the passage in the end housing is located inside a boss of the end housing that extends from an exterior wall of the end housing toward the rotor axis and the passage in the support housing is defined inside an exterior wall of the support housing.

19. The electric drive unit of claim 18 wherein lubricant flows from the transmission and through the second chamber to reach the sump portion.

20. The electric drive unit of claim 9 wherein the support housing includes a tubular portion that includes a first internal wall and a second internal wall that extends toward the rotor axis, wherein the shaft extends through the first internal wall and the second internal wall.

\* \* \* \* \*